United States Patent [19]

Taylor et al.

[11] Patent Number: 4,896,363
[45] Date of Patent: Jan. 23, 1990

[54] APPARATUS AND METHOD FOR MATCHING IMAGE CHARACTERISTICS SUCH AS FINGERPRINT MINUTIAE

[75] Inventors: Kenneth E. Taylor; Jeff B. Glickman, both of Champaign, Ill.

[73] Assignee: ThumbScan, Inc., Lombard, Ill.

[21] Appl. No.: 342,666

[22] Filed: Apr. 24, 1989

Related U.S. Application Data

[63] Continuation of Ser. No. 55,145, May 28, 1987, abandoned.

[51] Int. Cl.$^4$ .............................................. G06K 9/00
[52] U.S. Cl. ......................................... 382/5; 382/4; 382/23
[58] Field of Search ..................... 382/4, 5, 23, 17, 26; 356/71

[56] References Cited

U.S. PATENT DOCUMENTS

| | | | |
|---|---|---|---|
| 2,936,607 | 5/1960 | Nielsen . | |
| 3,195,396 | 7/1965 | Hortwitz et al. . | |
| 3,196,392 | 7/1965 | Hortwitz et al. . | |
| 3,383,657 | 5/1968 | Classen et al. | 340/825.34 |
| 3,419,287 | 12/1968 | Rudie | 283/69 |
| 3,558,864 | 1/1971 | French et al. | 235/150 |
| 3,564,266 | 2/1971 | Klotz, Jr. | 250/219 |
| 3,864,042 | 2/1975 | Leventhal | 356/71 |
| 3,873,970 | 3/1975 | McMahon et al. | 382/5 |
| 3,893,080 | 7/1975 | Ho et al. | 382/5 |
| 3,947,128 | 3/1976 | Weinberger et al. | 356/71 |
| 3,959,884 | 6/1976 | Jordan et al. | 382/5 |
| 3,993,888 | 11/1976 | Fellman | 235/151 |
| 4,003,656 | 1/1977 | Leventhal | 356/71 |
| 4,015,240 | 3/1977 | Swonger et al. | 382/5 |
| 4,053,228 | 10/1977 | Schiller | 356/71 |
| 4,120,585 | 10/1978 | DePalma et al. | 356/71 |
| 4,128,850 | 12/1978 | Fischer, II | 358/284 |
| 4,151,512 | 4/1979 | Riganati | 382/5 |
| 4,152,056 | 5/1979 | Fowler | 354/62 |
| 4,185,270 | 1/1980 | Fischer, II et al. | 382/5 |
| 4,210,899 | 7/1980 | Swonger et al. | 382/5 |
| 4,227,805 | 10/1988 | Schiller | 356/71 |
| 4,246,568 | 1/1981 | Peterson | 382/5 |
| 4,310,827 | 1/1982 | Asai | 382/5 |
| 4,322,163 | 3/1982 | Schiller | 356/71 |
| 4,394,773 | 7/1983 | Ruell | 382/4 |
| 4,414,684 | 11/1983 | Blonder | 382/4 |
| 4,468,807 | 8/1984 | Moulton | 382/2 |
| 4,532,508 | 7/1985 | Ruell | 340/825.34 |
| 4,537,484 | 8/1985 | Fowler et al. | 354/62 |
| 4,544,267 | 10/1985 | Schiller | 356/71 |
| 4,553,837 | 11/1985 | Marcus | 356/71 |
| 4,569,080 | 2/1986 | Schiller | 382/4 |
| 4,577,345 | 3/1986 | Abramov | 382/4 |
| 4,618,988 | 10/1986 | Schiller | 382/5 |
| 4,636,622 | 11/1987 | Clark | 235/380 |
| 4,696,046 | 9/1987 | Schiller | 382/4 |
| 4,747,147 | 5/1988 | Sparrow | 382/4 |

FOREIGN PATENT DOCUMENTS

| | | |
|---|---|---|
| 0168007 | 1/1956 | European Pat. Off. . |
| 0052348 | 5/1982 | European Pat. Off. . |
| 0090377 | 10/1983 | European Pat. Off. . |
| 0098607 | 1/1984 | European Pat. Off. . |
| 0159037 | 10/1985 | European Pat. Off. . |
| 0184775 | 6/1986 | European Pat. Off. . |
| 58-225488 | 12/1983 | Japan . |
| 59-24384 | 2/1984 | Japan . |
| WO8503362 | 8/1985 | World Int. Prop. O. . |
| WO8605903 | 10/1986 | World Int. Prop. O. . |

OTHER PUBLICATIONS

IBM Technical Bulletin, vol. 13, No. 1, 6/70, pp. 176-77.

Pernus, et al., Minutiae Based Fingerprint Registration, 1980, CH 1499—3/80/0000, IEEE, pp. 1380-1382.

*Primary Examiner*—Leo H. Boudreau
*Assistant Examiner*—Joseph Mancuso
*Attorney, Agent, or Firm*—Neuman, Williams, Anderson & Olson

[57] ABSTRACT

A system for matching images in which characteristic points of an image to be tested for a match, such as a fingerprint, are compared with characteristic points of a master image by attempting to match the distances between pairs of master characteristic points with distances between pairs of live characteristic points, whereby the coordinate system of the test image is not required to be aligned with the coordinate system of the master image. The matching system can be implemented in an identification mode in which the live image is attempted to be matched with each of a number of master images, or a verification mode in which the live image is attempted to be matched with a master image that is purported to be the same as the live image.

11 Claims, 15 Drawing Sheets

APPARATUS AND METHOD FOR MATCHING IMAGE CHARACTERISTICS SUCH AS FINGERPRINT MINUTIAE

This is a continuation of application Ser. No. 055,145, now abandoned, filed on May 28, 1987, the text of which is hereby incorporated by reference.

This invention relates generally to the field of image matching, and in particular, matching a "live" or test image to a previously stored representation of a master image on the basis of identifying characteristics found in the live image and the master image. In this context, the image to be matched can be a two-, three-, or n-dimensioned object, pattern or picture. Identifying characteristics are characteristics that are generally unique to the image and unvarying and which can be expressed as point locations in a suitable coordinate system. Generally, matching can be applied as a verification technique where the live image is compared with a known image to determine whether the tested image is the same as the known image, or matching can be applied as an identification technique where the live image is compared with each one of a collection of known images to determine whether the live image is within the collection of images and, if so, which of the known images corresponds to the tested image.

BACKGROUND OF THE INVENTION

Although the present invention can be applied generally in the field of image matching, the invention has particular utility in the area of personal identification. Matching in the context of the identification or verification of a person's identity is a burgeoning industry. While most often associated with security in sensitive government and commercial installations, matching for personal identification has potential application wherever a person's identity needs to be identified or verified, e.g., in the control of access to physical locations such as nuclear power stations, airports and other transportation facilities, industrial locations and in the home; in the control of access to computing and data management equipment; and in banking or commercial transactions. In recent years, special emphasis has been placed on developing what has come to be known as biometric identification.

Biometrics is the study of biological phenomena, and in the area of personal identification some chosen characteristic of a person is used to identify or verify that person's identity. Biometric identification has gained interest in recent years because certain personal characteristics have been found to be substantially unique to each person and difficult to reproduce by an imposter. Further, the recording and analysis of biometric data is generally susceptible to automation owing to the increased use of computer controlled electronics and digital recording techniques.

The biometric identifying characteristic may be biologically determined as with a fingerprint, or it may be some characteristic that is learned or acquired, such as handwriting or voice patterns. Ideally, the characteristic should be unique for every person and unvarying over the time frame during which the person may be tested for identification. The characteristic should also be difficult to duplicate by an imposter in order to secure against erroneous identification.

Some of the biometric characteristics most investigated today for use in a personal identification system include fingerprints, hand or palm prints, retina scans, signatures and voice patterns. Hand or palm print techniques typically evaluate the shape of a person's hand or other significant features such as creases in the palm, but these techniques may be fooled by templates or models of the hand of an authorized person. Retina scanning techniques evaluate the pattern of blood vessels in a person's retina. A drawback of this technique is that the blood vessel pattern may vary over time, e.g., when alcohol is in the blood stream or during irregular use of glasses or contact lenses. Also, a user may feel uneasy about having his or her eye illuminated for retina scanning or the possibility of eye contamination if there is contact between the eye and the scanning apparatus. Signatures can be forged easily and must usually be evaluated by a human operator, although work has been done on automated systems that evaluate the dynamics of a person's handwriting, such as the speed and the force of hand movement, pauses in writing, etc. Using voice patterns as the identifying characteristic encounters difficulties owing to the wide variations in a person's voice over time, the presence of background noise during an evaluation and the potential for an imposter to fool the system with a recording of the voice of an authorized person.

The most commonly used biometric characteristic and the one that has been the most investigated and developed is, of course, the fingerprint. Up until now, the technology of personal identification through fingerprint analysis has been used mainly in law enforcement, and this long term experience with fingerprint analysis has developed a large amount of information about fingerprints and has confirmed the uniqueness of a person's fingerprints. Historically, in law enforcement, fingerprints have been recorded by inking the fingerprint and making a print on a card for storage. Particularly for applications outside law enforcement, less burdensome and intrusive recording methods needed to be developed.

Over the past several years, there have been developed various electro-mechanical systems for recording and matching a live fingerprint with a stored representation of the fingerprint of the authorized person. In one type of system, an image of the live fingerprint pattern is read and optically compared with a master fingerprint pattern that may be stored on film. Difficulties arise in this system in aligning the live and the master fingerprint patterns, leading to the use of complicated devices to secure the user's finger in exact alignment with the recording device or to rotate and translate the live pattern with respect to the stored pattern to find registration. Further, because this type of system relies on a precise one-to-one sizing of the live and stored fingerprint patterns, errors in matching can occur where the live fingerprint pattern is deformed even slightly, e.g. when the finger is swollen or is pressed hard against the reading surface.

In another type of fingerprint matching system, the live fingerprint is read and the image is compared with a hologram of the fingerprint of the authorized person. This system requires the storage of a library of holograms at the testing location for each authorized person in the system and the use of a specialized light source and a complicated optics system.

The trend in automatic fingerprint matching is toward the increased use of electronics and computer control of the matching process, while minimizing the reliance on moving mechanical parts and complicated optics systems. In such a system the live fingerprint typically is scanned and digitally recorded as a binary, i.e., two-tone, image of the fingerprint pattern. Characteristic features of the fingerprint pattern, such as ridge endings, points of ridge bifurcation, and the core of a whorl——collectively called the minutiae of the fingerprint pattern——are found in the binary fingerprint image and then compared with master minutiae that have been derived previously from a fingerprint of the authorized person in order to determine whether there is a match.

The minutiae of both the live and the master fingerprints are defined as the X and Y coordinates of the minutiae relative to the coordinate system of the image from which they were derived. Additional data describing the fingerprint pattern can be used to reduce the chance of making a false match. These can include the "angle" of a minutia, i.e., the direction of a ridge or ridge pattern immediately adjacent to a minutia, the number of other minutiae appearing in a predetermined region surrounding a minutia point, the number of ridge lines appearing between two minutiae, or some other topological feature of the fingerprint. A significant disadvantage of this type of system is that the user's finger typically is required to be in exact alignment with the image recording device so that the coordinate system of the binary image derived from the live fingerprint and of the live minutiae is in the same orientation and position as the coordinate system on which the master minutiae are based.

The present invention presents a novel apparatus and method for matching characteristic points of a live or test image to characteristic points of a stored or master image and has particular application in fingerprint matching systems to improve upon the above described conventional systems.

SUMMARY OF THE INVENTION

The invention is an improved system for matching images and will be described in terms of a specific embodiment for matching fingerprints for the purpose of personal identification. Given a list of minutiae points for a live fingerprint to be tested, which minutiae have been extracted from the fingerprint pattern by any one of the known methods, the present invention provides an improved way to match the minutiae points with minutiae points that have been previously stored or derived from a master fingerprint for the authorized person in such a way that the analysis is independent of any rotational or translational difference between the coordinate system of the live fingerprint relative to the coordinate system of the master data. The minutiae of each of the live and master fingerprints are defined as X,Y coordinate points in a Cartesian coordinate system. Such a set of minutiae points is called a feature vector because it represents a listing of the characteristic features of the fingerprint pattern.

In accordance with the technique of the present invention, a distance spectrum is calculated for each of the minutiae points found in the live fingerprint pattern. The distance spectrum for a particular minutia point is a listing of the distances between that minutia point and each one of the other minutiae points found in the live fingerprint pattern. Distance spectra are also calculated for the master minutiae points previously extracted from a master fingerprint. To compare the live distance spectra with the master distance spectra, each spectrum of distances in the master data is attempted to be matched with a spectrum of distances in the live data. Owing to possible deformations in the live fingerprint pattern the comparison is done in accordance with a predetermined tolerance. On the occurrence of a suitable match between the live distance data and the master distance data, a person's identity is verified and the appropriate action can then be taken.

Because the minutiae representing the live and the master fingerprint patterns are compared on the basis of the relative positioning of the minutiae in each set of minutiae, the system of the invention does not require alignment between the coordinate system of the live fingerprint and the coordinate system of the master fingerprint. The present invention therefore does not require the use of any alignment system for reading the live fingerprint image and will operate properly regardless of the rotational angle or the translational displacement of the live fingerprint on the fingerprint reading apparatus.

BRIEF DESCRIPTION OF THE DRAWINGS

The above and other features and advantages of the invention as well as a fuller description of the invention itself will become more apparent to those skilled in the art in view of the following detailed description taken together with the accompanying drawings in which like referenced numerals and labels indicate corresponding parts or elements throughout the several views and wherein.

FIGD. 5A and 5B are a functional flow chart showing the steps of a matching technique in accordance with the invention.

Figure 6A:
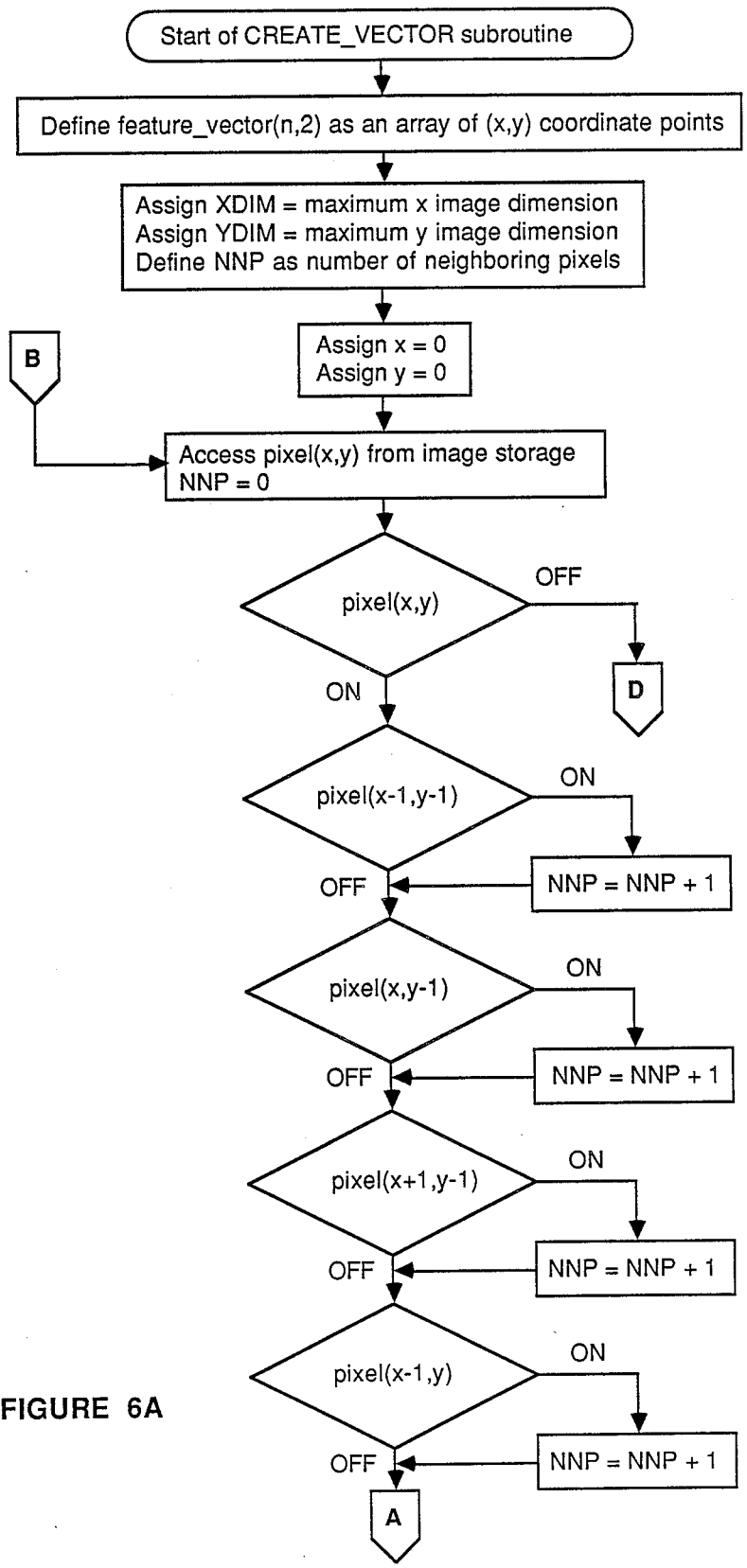
Figure 6B:
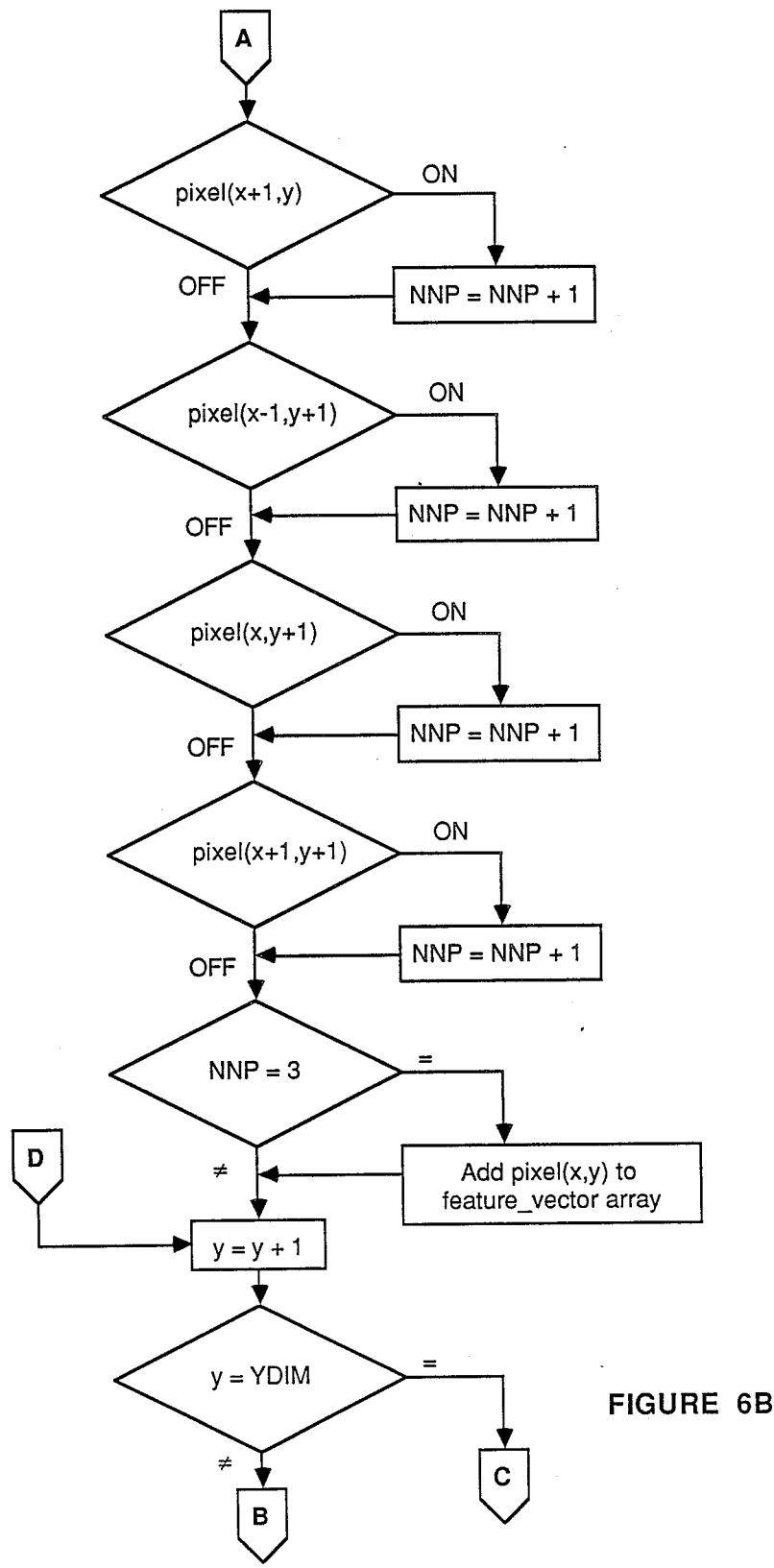
Figure 6C:
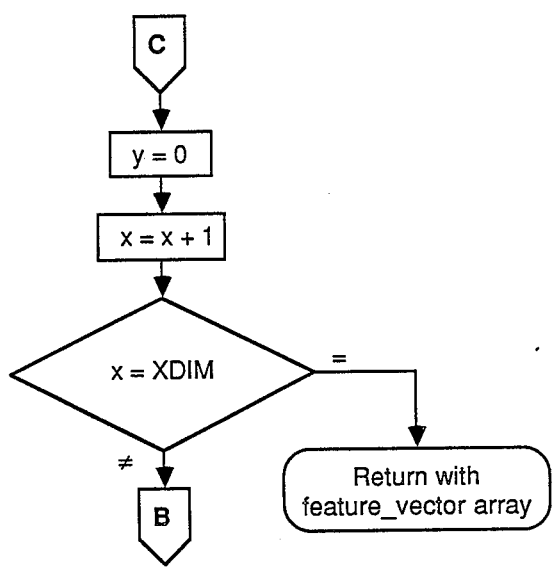

FIGS. 6A–6C are a functional flow chart showing the steps in extracting the characteristic points of an image.

Figure 7:
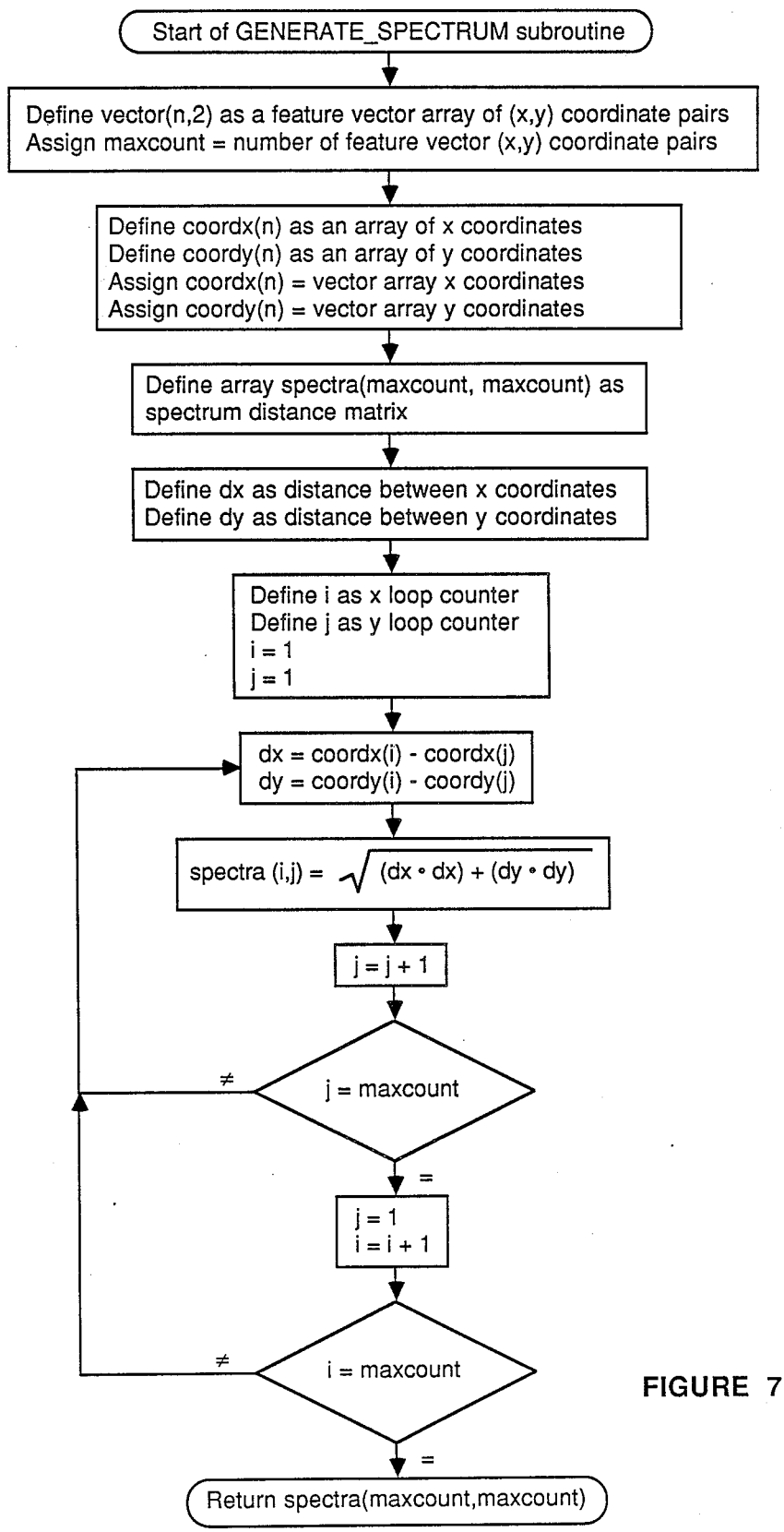

FIG. 7 is a functional flow chart showing the steps in deriving distance spectra, i.e., sets of distances from each characteristic point to all other characteristic points of an image, in accordance with the invention.

Figure 8:
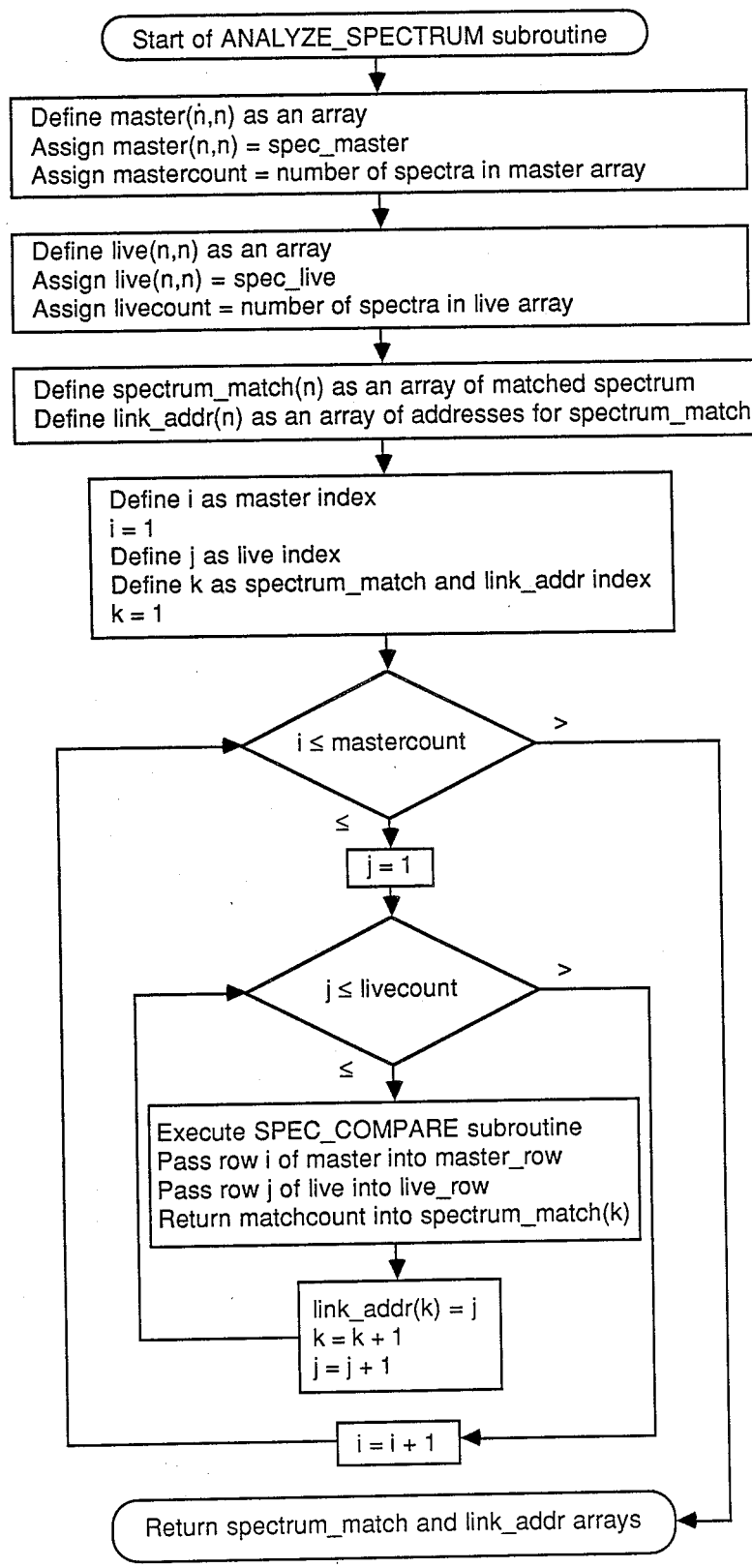

FIG. 8 is a functional flow chart showing the steps in comparing distance spectra derived from an image to be tested and distance spectra representative of a master image.

Figure 9A:
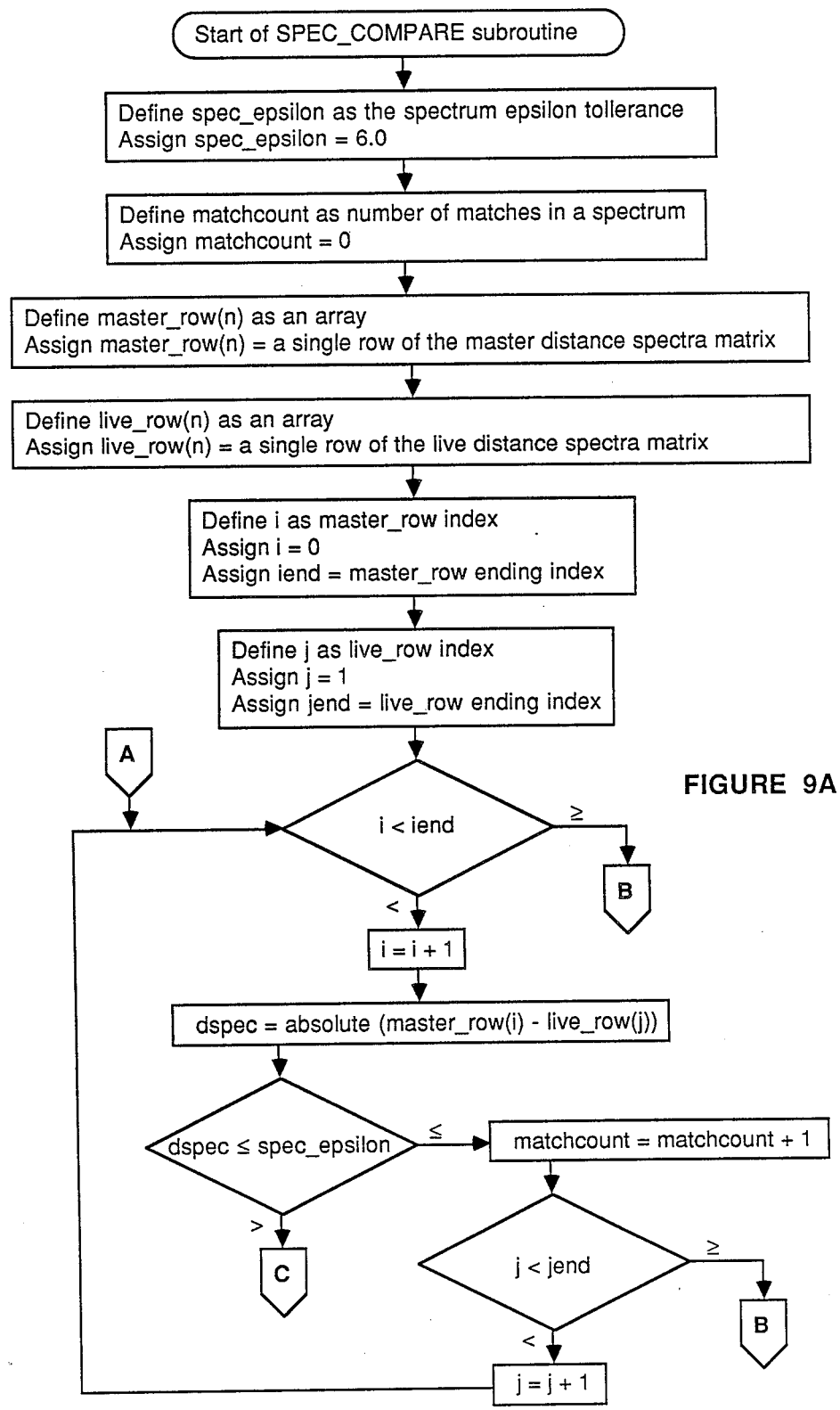
Figure 9B:
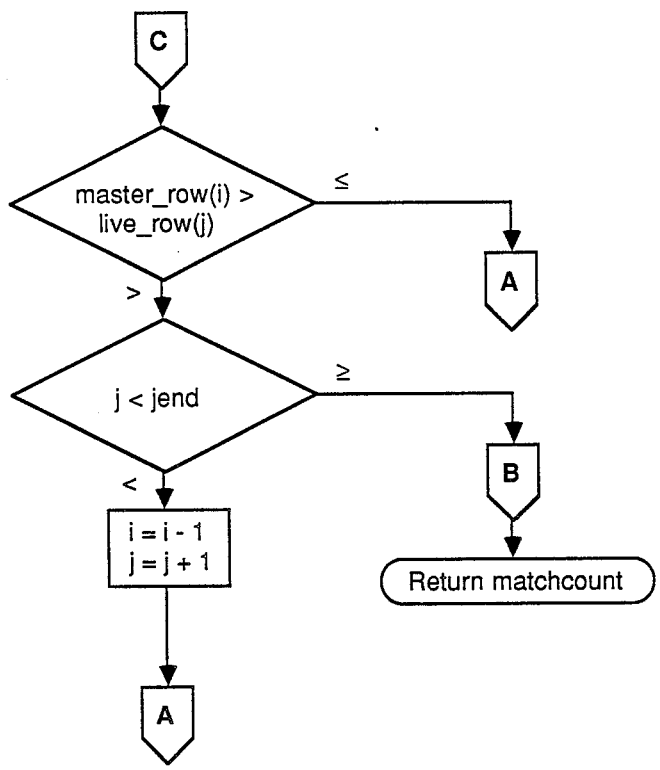

FIGS. 9A and 9B are a more detailed functional flow chart showing the steps of a process of matching distance spectra.

Figure 10A:
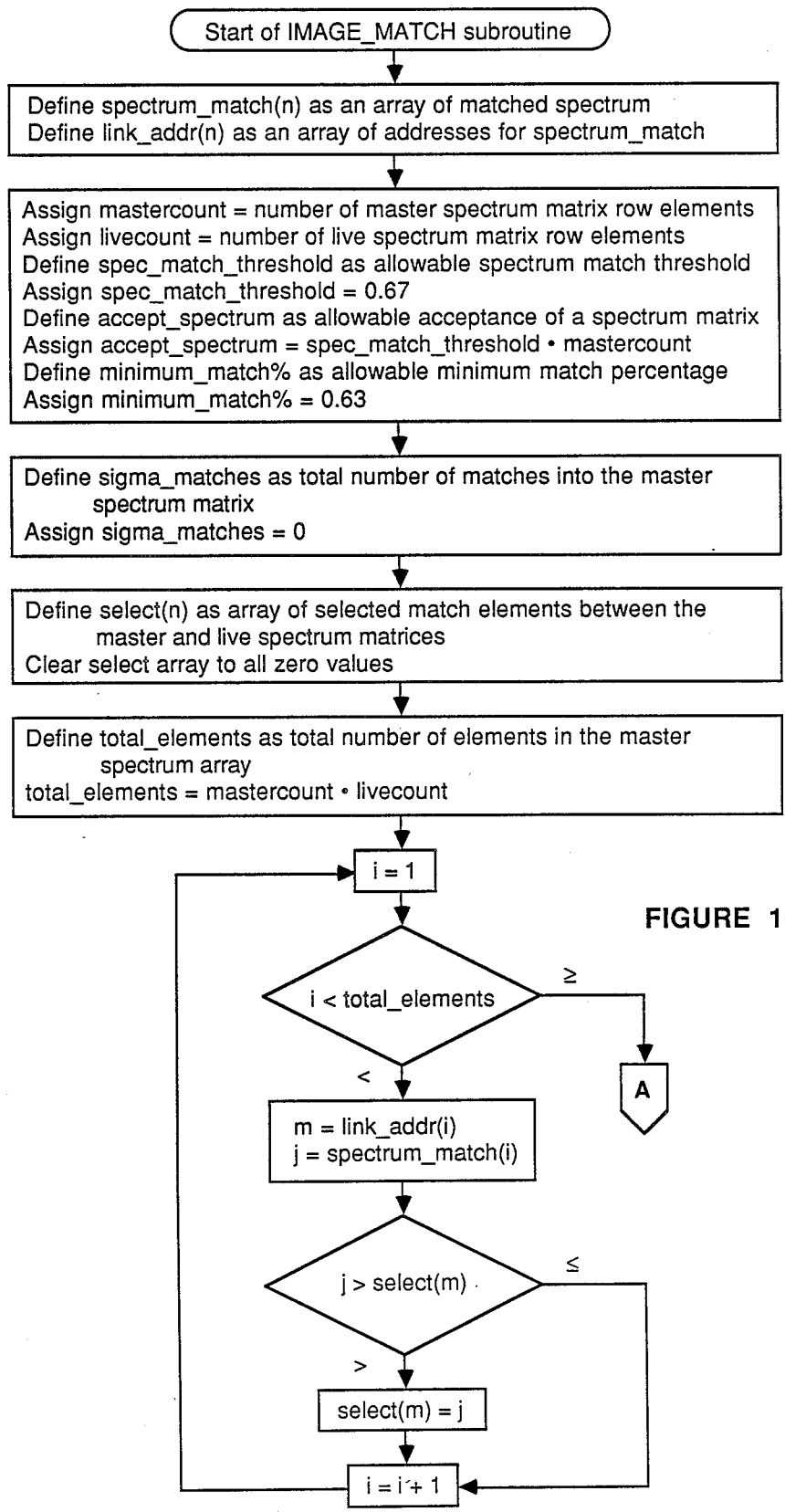
Figure 10B:
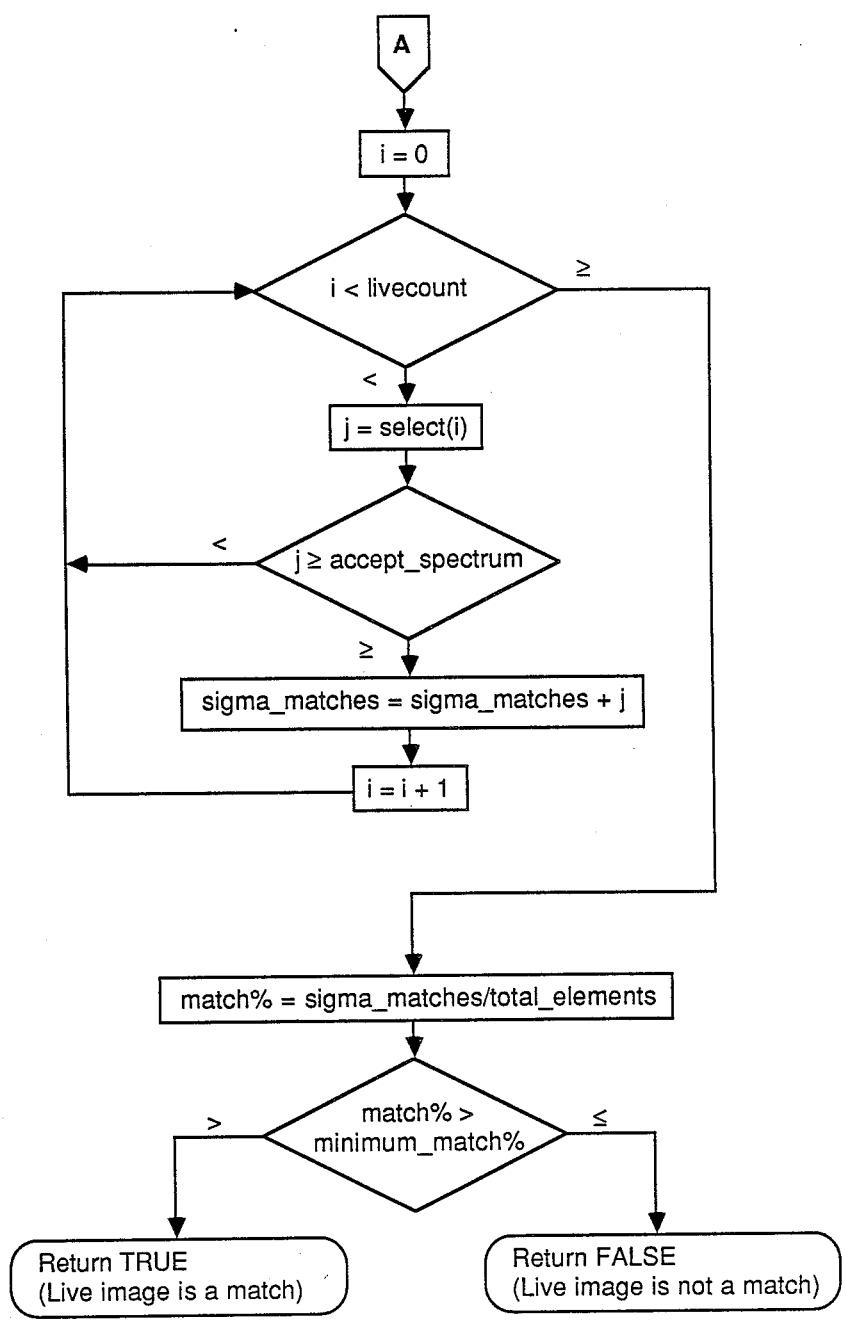

FIGS. 10A and 10B show a functional flow chart of the steps in evaluating the results of the matching process.

DETAILED DESCRIPTION

Figure 1:
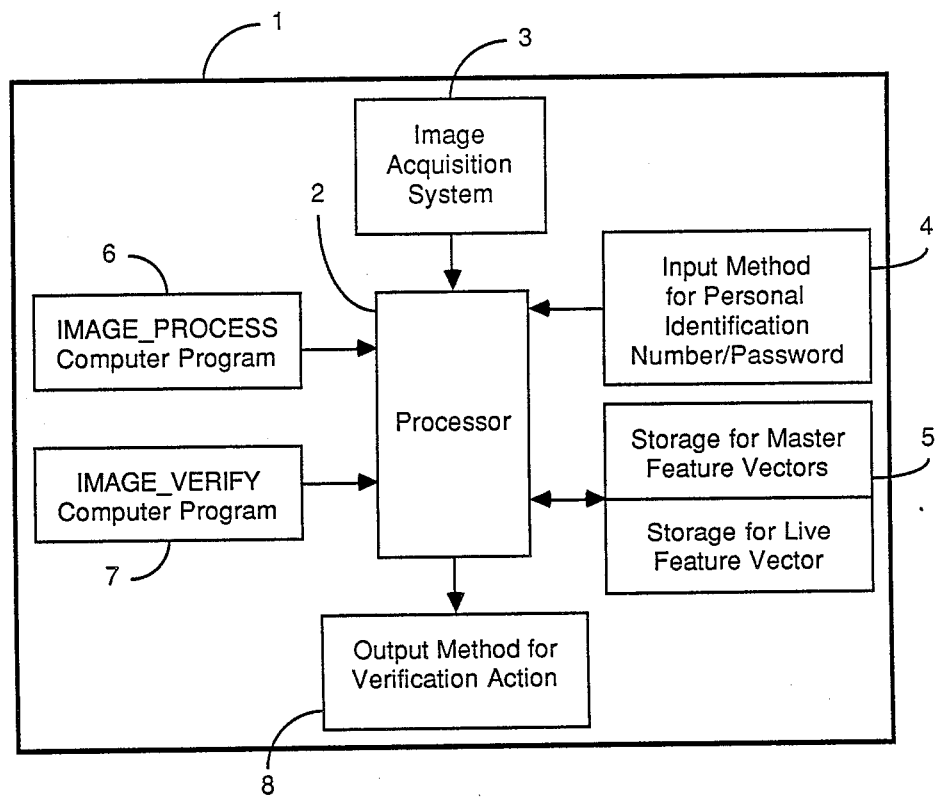
FIG. 1 is a functional block diagram of a stand-alone matching system that may incorporate the present invention.
Figure 2:
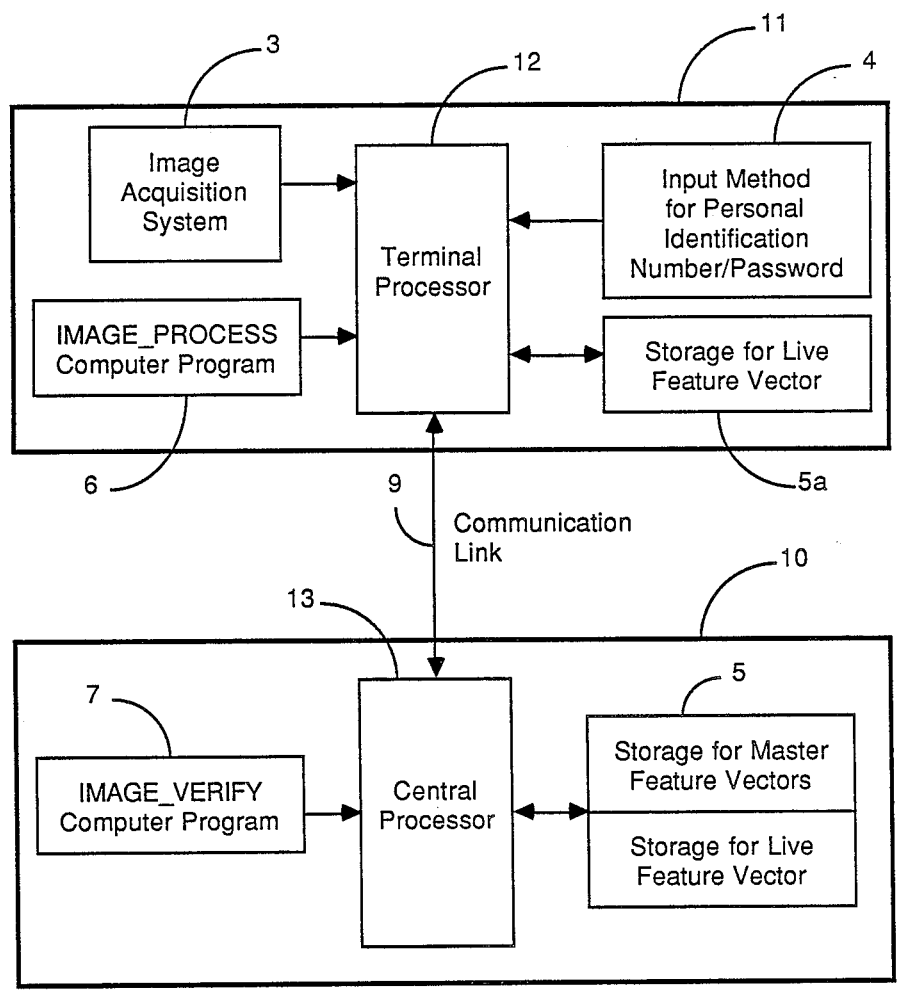
FIG. 2 is a functional block diagram of a second embodiment including one or more remote terminals for the entry of live images that may be used in a matching system incorporating the present invention.

Turning now to the drawings, FIG. 1 and FIG. 2 show two basic types of system for matching images. FIG. 1 represents a stand-alone system 1 in which the live image to be tested is acquired at the same location that the matching is to be done, whereas FIG. 2 represents a system having a central station 10 connected by a suitable communication link 9 with one or more remote terminals 11.

The stand-alone system 1 contains an image acquisition system 3, an input method 4 for receiving a personal identification code, and an output method 8 for initiating a desired action based on the outcome of the attempt to match. The matching system 1 also contains a processor 2, a storage 5 for the live characteristic data and a library of sets of master characteristic data, as well as the IMAGE_PROCESS program 6 and the IMAGE_VERIFY program 7 that operate in conjunction with the processor 2 to extract characteristic points of an image and compare the live data to the master data.

The invention will be described in more detail in accordance with the embodiment shown in FIG. 2 and for the particular application of matching fingerprints, although it is understood that the invention is equally applicable to the system configuration shown in FIG. 1 and can be used to match images besides fingerprints. Further, the invention can be used in matching systems to search for the identity of a person whose fingerprint image is being tested, as in law enforcement applications, or, as described hereinafter, the invention can be used in a verification system in which the person seeking verification of identity essentially alleges his or her identity and an attempt is made to match the fingerprint of that person with a master fingerprint of that person whose identity is alleged.

The embodiment shown in FIG. 2 basically comprises one or more remote terminals 11 each of which is connected by a suitable communication link 9 to the central station 10. The terminals 11 are identical, and the invention will be described hereafter in terms of a single terminal 11. The terminal 11 acquires the live image to be tested, processes the image to obtain its characteristic points and transmits the characteristic points of the live image to the central station 10 to be evaluated for a match. The terminal 11 includes the image acquisition system 3, the input method 4, a local storage 5a for storing characteristic points of the live image, a terminal processor 12, and the IMAGE_PROCESS program 6. The terminals may be stationed at any location where physical access is to be controlled or personal identification is required, e.g., computer terminals, building entry points, automatic banking tellers. The central station 10 includes the equipment and programming that is necessary to evaluate the live data received from a remote terminal, which are a central processor 13, the storage 5 and the IMAGE_VERIFY program 7.

In general, to verify his or her identity, a person activates the matching system by entering a personal identification code or number (PIN) that is uniquely assigned to the person. This is done through the input method 4, which may be a keyboard, keypad, card reader or other conventional method. The person then places a selected finger on a fingerprint reader at the terminal. Each remote terminal 11 includes an image acquisition system 3 for "reading" the fingerprint, forming a binary image thereof and storing the image in a suitable random access memory (not shown).

After the binary image of the live fingerprint pattern is obtained and stored, the IMAGE_PROCESS program 6 in the remote terminal 11 processes the image to simplify the digitized fingerprint pattern and also to identify the characteristic points or minutiae of the fingerprint. The fingerprint pattern that is stored as a binary image is formed of ridges that may be more than one pixel in width. The simplification procedure essentially reduces the fingerprint pattern to a skeleton of ridges all of only one pixel width. Given the "thinned" skeleton image of a fingerprint, the X,Y coordinates of characteristic minutiae are identified. The resulting list of minutiae points constitutes the "feature vector" that is transmitted to the central station 10 for evaluation. At the central station 10 the feature vector is processed to obtain a unique set of data for the fingerprint that is independent of the rotational angle or translational displacement of the live fingerprint relative to the fingerprint reader of the terminal 11. For each minutia in the feature vector received from the remote terminal 11 the distances to all other minutiae in the feature vector are calculated by the IMAGE VERIFY program 7. In this form the data is independent of any particular orientation of the live fingerprint——only the relative distances between the minutiae matter.

A library of fingerprint data for the persons expected to be using the system is stored on any suitable nonvolatile storage medium at the storage 5 and is available to the central processor 13. The fingerprint data for each person may be represented in a master feature vector that was obtained at an initial enrollment of the person. For enrollment, the person essentially has his or her selected finger read and processed (as described above) a number of times until consistent data for a master feature vector are obtained.

The PIN of the person requesting verification of identity is used by the central processor 13 to locate and retrieve the master feature vector for the person whose identification number was entered. Alternatively, the master data at the central station 10 can be stored as sets of previously computed distances between minutiae as described above. This requires more storage space although less computation is required each time a verification is requested. If a feature vector of master minutiae is stored, the central processor 13 must compute master sets of distances based on the minutiae listed in the master feature vector.

After obtaining the master data, the central processor 13 operates under the control of the IMAGE_VERIFY program 7 to attempt to match the live data with the master data. On the occurrence of a suitable match between the live data and the master data the person's identity is deemed to be verified, and a signal is sent from the central station 10 back to the remote terminal 11 that requested the verification to indicate the match. Acting on this signal, the remote terminal 11 can then permit access to a guarded site, signify that a verification has been made for the benefit of a human operator (e.g., bank teller or airport security guard), enable the operation of computer equipment, etc.

Figure 3:
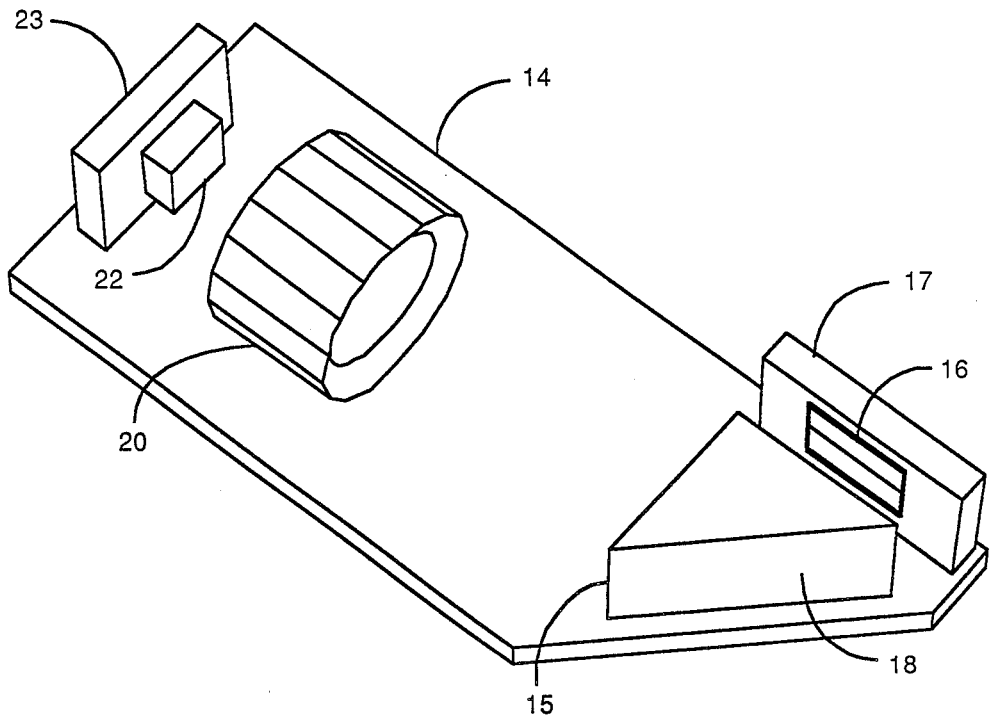
FIG. 3 is a diagram of an optics assembly that may be used to obtain a binary image for use with the present invention.

The various elements of the matching system shown in FIG. 2 will now be explained in more detail. The image acquisition system 3 contains an optics assembly for sensing and recording the live fingerprint image. An example of a suitable optics assembly is shown in FIG. 3. The components of the optics assembly are mounted on the base plate 14. An array 16 of LEDs, housed in the frame 17, illuminates the diagonal face 18 of the right angle prism 15 from behind. In operation, a user places his or her finger on the diagonal face 18 of the prism 15 which serves as a reading surface. Light from the LED array 16 is shone on the back of the diagonal face of the prism 15. Where a valley occurs in the fingerprint the skin is not touching the prism; the light from the LED array 16 impinging on the reading surface 18 of the prism at these locations is reflected internally in the prism, through the lens 20 and onto a total imaging device 22 which is mounted on the frame 23. Where a ridge occurs in the fingerprint the skin touches the prism and the light from the LED array 16 is not reflected onto the imaging device 22. Thus a high contrast image of the fingerprint is focussed by the lens 20 onto the imaging device. The fingerprint image is then stored in a suitable digital memory as a binary image, a two-tone picture of the ridge and valley pattern of the live fingerprint.

The imaging device 22 may be any total image sensor that is capable of sensing an image and translating it into a binary image. One such device is the IS32 OpticRam produced by Micron Technology, Inc., of Boise, Idaho. Essentially this device comprises a matrix of light sensitive binary elements or pixels, each containing a capacitor that will discharge when light strikes the element. In operation the sensing elements are turned on by charging the capacitors to an initial value. The refresh signal is disabled and then an image is focussed on the array. Elements in the array that are exposed to light will turn off, i.e., the capacitors will discharge, resulting in a two-tone image corresponding to the image focussed on the device. In the case of the IS32 imaging device, the sensor itself can be used as a memory so that a separate memory to store the binary image is not necessary.

Alternatively, any conventional imaging system may be used to sense and record the fingerprint image. For example, this may be a system in which the fingerprint image is produced by the internal reflection technique previously described and scanned in raster fashion, using a single photodetector or a linear array of photodetectors to translate the pattern of light falling on it into electrical signals. Typically, a pivoting mirror is used to move the fingerprint image over the stationary photodetector device. However, by using a total imaging device such as the IS32 sensor, the moving mechanical and/or optical portions of the described conventional systems are eliminated, as well as the programming necessary to synchronize the moving parts with the electronic recording apparatus.

FIGS. 4-10 are functional flowcharts showing a preferred embodiment of a technique for matching an image in accordance with the invention. This technique can advantageously be implemented as software programming on the terminal processor 12 and the central processor 13 of the matching system, or the technique may be implemented as hard wired processors or as a combination of the two approaches. For the purpose of this description, the technique will be explained in terms of software programming.

The two major programs are IMAGE_PROCESS, which derives a feature vector or list of characteristic minutiae from the live fingerprint being tested, and IMAGE_VERIFY, which effectively compares these live minutiae to previously computed master minutiae, in order to test for a match. In the stand-alone system shown in FIG. 1, the IMAGE_PROCESS program 6 and the IMAGE_VERIFY program 7 operate in conjunction with the processor 2. In the system configuration shown in FIG. 2, the IMAGE_PROCESS program 6 is resident in the remote terminal 11 and operates in conjunction with the terminal processor 12, while the IMAGE_VERIFY program 7 is resident in the central station 10 and operates in conjunction with the central processor 13.

Figure 4:
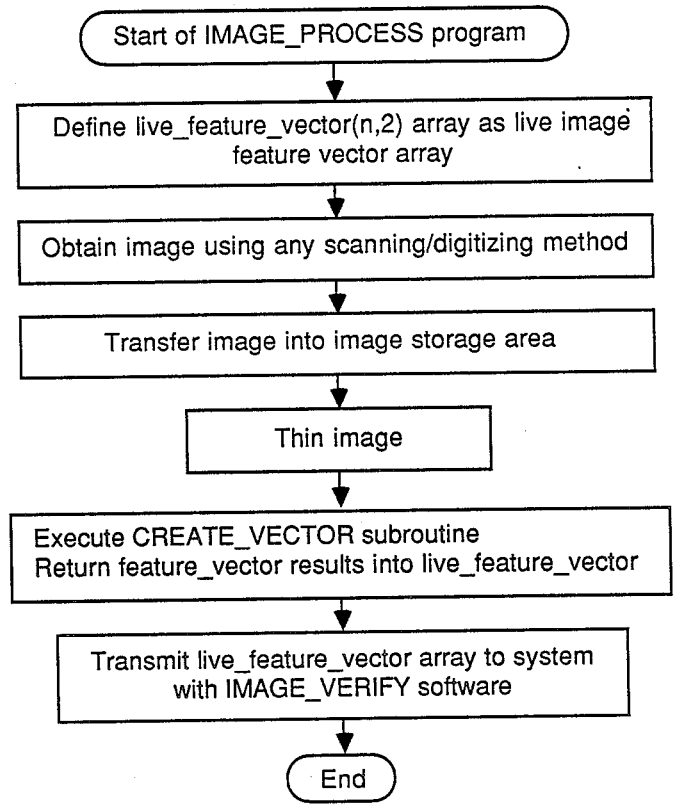
FIG. 4 is a functional flow chart showing the steps in extracting from a live image a feature vector listing characteristic points of the live image for use in the invention.

FIG. 4 shows the IMAGE_PROCESS program. *Live-feature-vector* is defined as an n x 2 array. This array will eventually contain the X and Y coordinates of each of the minutiae found in the live fingerprint. Although a Cartesian coordinate system is used in the described embodiment, any other coordinate system can equally well be used under the technique of the invention. n is chosen in consideration of the maximum number of minutiae that can normally be found in the area of interest in the fingerprint. It has been found that for an area of about one square centimeter around the core of a fingerprint, there are about ten bifurcation minutiae. Under those parameters, it would be satisfactory to set n equal to twenty for the maximum number of expected minutiae.

Under the direction of the IMAGE_PROCESS program, a binary image of the live fingerprint pattern is obtained and stored by the image acquisition system 3 as described above. In order to facilitate the recognition of minutiae in the fingerprint image, the stored fingerprint image is then thinned so that each ridge line is one pixel wide. The thinning procedure can be done in any known way. See, for example, *Algorithms For Graphics and Image Processing,* Chapter 9, by Theo Pavlidis, Computer Science Press 1982. It is not strictly necessary that the fingerprint image be thinned in order to obtain the minutiae, but the minutiae detection procedure is simpler and can operate more quickly if the fingerprint image is first simplified by thinning.

Once the fingerprint image is simplified, the CREATE_VECTOR subroutine is called by IMAGE_PROCESS. This subroutine, described in more detail with reference to FIG. 6, derives the X and Y coordinates of the minutiae found in the live fingerprint image and returns the coordinates to IMAGE_PROCESS in the *live-feature-vector* array. The operation of the IMAGE_PROCESS program concludes by transmitting the minutiae coordinate information in the *live-feature-vector* array to the processor operating in conjunction with the IMAGE_VERIFY program. In the system configuration shown in FIG. 2, the minutiae coordinate information is transmitted over the communication link 9 to the central processor 13 of the central station 10. To prevent the unauthorized electronic recording of the minutiae information as it is transmitted over the communication link 9, the information may be encrypted before it is transmitted and decrypted when the information has been received by the central station 10.

The CREATE_VECTOR subroutine, shown functionally in FIGS. 6A-6C, begins by defining *feature-vector* as an n×2 array. This is a temporary array that accumulates the X and Y coordinates of minutiae as the minutiae are identified in the thinned fingerprint image. *xdim* and *ydim* are the maximum X and Y dimensions of the image being analyzed, and *nnp* is the running total of "on" pixels immediately surrounding a particular image pixel being evaluated.

This subroutine evaluates the region immediately adjacent each on pixel in the fingerprint image to determine whether the pixel represents a minutia point. Specifically, each pixel surrounding the pixel being evaluated is checked to see whether it is on or off. If only one of the adjacent pixels is on, the pixel being evaluated is the end of a ridge line. If three adjacent pixels are on, the pixel being evaluated is a bifurcation point. Although both of these types of minutiae, or other types of minutiae, can be searched the present embodiment functions to identify only bifurcation minutiae, which have been found to be sufficient for matching a fingerprint.

As shown in FIG. 6, a single pixel is obtained from the binary image for evaluation. If the pixel is on, then its neighboring pixels are checked; otherwise, the next pixel in the binary image is retrieved for evaluation. When successively checking the state of neighboring pixels, if a neighboring pixel is on, nnp is incremented by one. After evaluating all eight surrounding pixels, if nnp equals three the pixel being evaluated is a bifurcation minutia and the X and Y coordinates of the pixel are stored in the *feature-vector* array.

The subroutine continues scanning through the fingerprint image, evaluating each pixel to see whether it is a bifurcation minutia, and stops when all pixels of the image have been evaluated. At the completion of this evaluation, the *feature-vector* array contains the X and Y coordinates of each bifurcation minutia in the fingerprint image. This *feature-vector* array is returned to the main program IMAGE_PROCESS (FIG. 4) as the *live-feature-vector* and is subsequently transmitted to the central processor 13 for use by the IMAGE_VERIFY program.

Figure 5A:
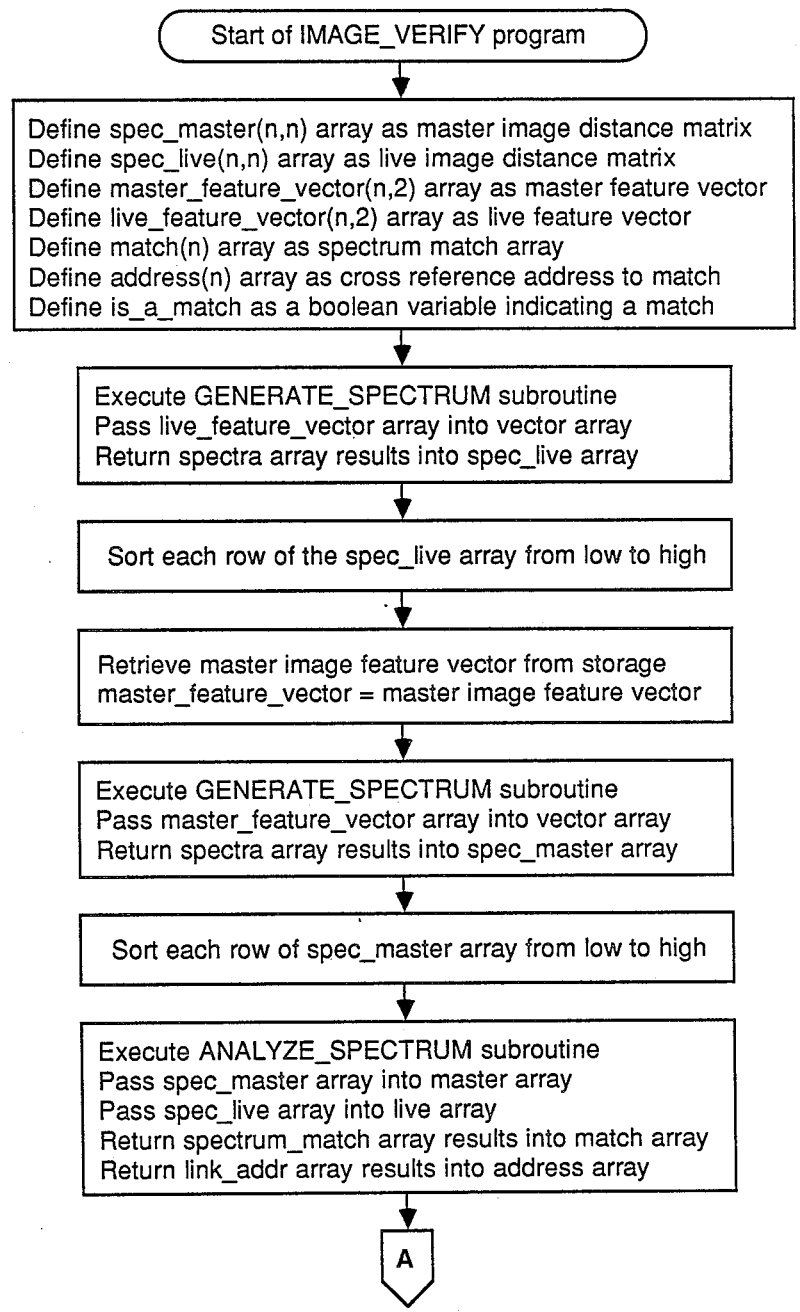
Figure 5B:
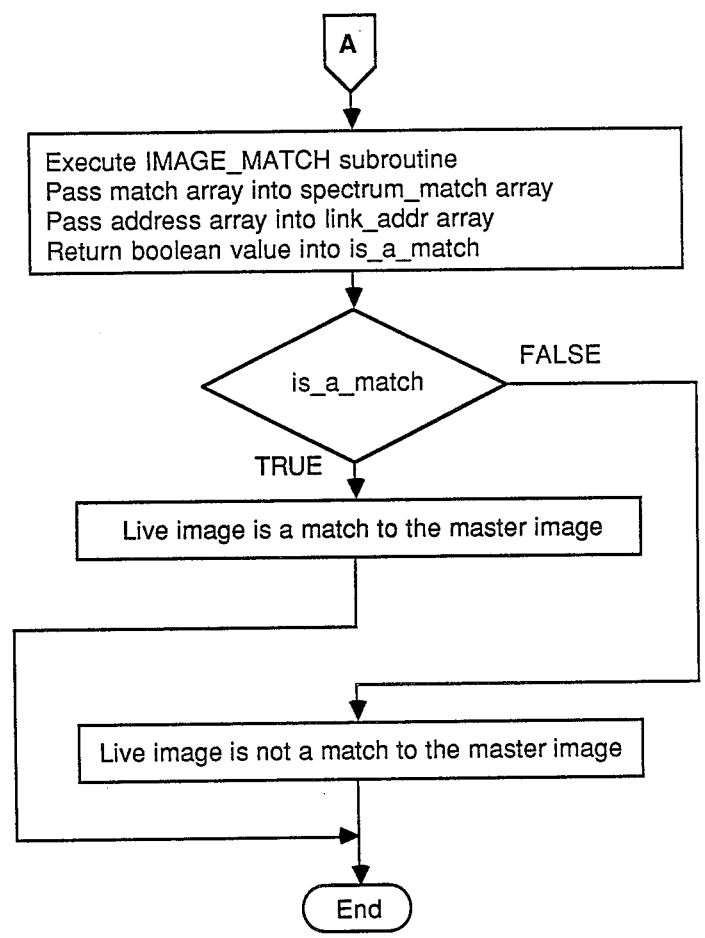

The IMAGE_VERIFY program, resident in the central station 10, is described in FIGS. 5A-B. Generally, this program performs the analysis to determine whether the live fingerprint being tested matches the fingerprint of the person whose identity is claimed. Initially several arrays and variables are defined:

*spec-master* is an nxn array which will hold sets of distances between each minutia in the master fingerprint and the other minutiae in the master fingerprint;

*spec-live* is an nxn array which will hold sets of distances between each minutia found in the live fingerprint image and the other minutiae in the live fingerprint image;

*master-feature-vector* is an n×2 array which will hold the X and Y coordinates of the minutiae previously derived from the master fingerprint;

*live-feature-vector* is an n×2 array as previously defined, i.e., it holds the X and Y coordinates of the minutiae found in the live fingerprint image;

*match* is a linear array having n elements (where here n equals the number of locations in *spec-master* and *spec-live*) which will hold the differences between the distance values in *spec-master*
and *spec-live;*

*address* is a linear array of the same length as *match* and is an index to *match*, i.e., it will identify which one of the live minutiae is associated with the location in *match* corresponding to each location in *address;* and

*is-a-match* is a Boolean variable which will be "true" if a match is found or "false" if a match is not found.

As a first step in IMAGE_VERIFY, the subroutine GENERATE_SPECTRUM is called upon to create a two-dimensional matrix of distances between each possible pair of minutiae points identified in *live-feature-vector*. In general, GENERATE_SPECTRUM produces a set or spectrum of distances for each minutia represented in the feature vector passed to it for processing, where the set of distances for each minutia consists of the distances between that minutia and each other minutia in the feature vector. The GENERATE_SPECTRUM subroutine is described in FIG. 7 by way of a functional flowchart and will be explained in more detail later. In a variation of the presently described embodiment, distance spectra can be calculated for fewer than all of the minutiae points and the matching technique of the present invention can still be utilized, but the possibility of erroneously acknowledging a match will increase.

The first time GENERATE_SPECTRUM is called by the IMAGE_VERIFY program, the minutiae found in the live fingerprint image——identified by their X,Y coordinates in the *live-feature-vector* array——are processed to produce the distance spectra for the minutiae of the live fingerprint being tested. These distance spectra are returned to the IMAGE_VERIFY program as the *spec-live* array. Each distance spectrum in *spec-live*, where each row of *spec-live* represents a distance spectrum corresponding to a different minutia, is then sorted by any conventional sorting technique to order the distance values in the spectrum by increasing magnitude.

After *spec-live* has been generated and sorted, IMAGE_VERIFY performs the same processing on the stored master data as was just done for the live data. First, the appropriate master feature vector is retrieved from the storage area 5. As already mentioned, the storage area 5 contains a master feature vector for each person expected to be using the matching system. The matching process will attempt to match the live feature vector with the master feature vector associated with the PIN entered through the input method 4 by the person being tested. After the information in the master feature vector is retrieved and read into *master-feature-vector*, the GENERATE_SPECTRUM subroutine is called again and this time processes the master feature vector data to produce distance spectra representative of the master fingerprint. These distance spectra are stored in the *spec-master* array. As with the live distance spectra, each distance spectrum in *spec-master* has its distance values sorted in order of increasing magnitude.

At this point, the live distance spectra and the master distance spectra are in the same format and the ANALYZE_SPECTRUM subroutine is called. The operation of this subroutine is illustrated by a functional flow chart in FIG. 8 and will be described in greater detail below. For the purpose of understanding the operation of the IMAGE_VERIFY program, ANALYZE_SPECTRUM can be thought of as comparing the distance spectrum associated with each minutia recorded for the master fingerprint with each of the distance spectra associated with the minutiae found in the live fingerprint to look for a live distance spectrum matching the master distance spectrum within a predetermined tolerance.

For this analysis, *spec-master* is passed to ANALYZE_SPECTRUM as master and *spec-live* is passed as live. *Spectrum-match* and *link-addr* are linear arrays which indicate the degree of match between all of the master distance values and the live distance values and are returned to IMAGE_VERIFY in the form of the *match* and *address* arrays. From the IMAGE_VERIFY program (see FIG. 5B), the information of the correlation between the live and the master distance spectra is passed to the IMAGE_MATCH subroutine and evaluated in accordance with predetermined criteria to determine whether an overall match exists. The operation of the IMAGE_MATCH subroutine is illustrated in FIGS. 10A-B and will be explained in more detail later.

If a match is found to exist by IMAGE_MATCH, *is-a-match* is "true" in the IMAGE_VERIFY program; otherwise, *is-a-match* is "false". On the occurrence of a match, a suitable signal is transmitted by the central station 10 to the remote terminal 11 over the communication link 9 indicating that the identity of the person being tested has been verified. This signal can then be used by the remote terminal to open a door, allow access to a personal computer, activate a display to inform a human operator such as a bank teller or salesperson that the person's identity has been verified, or initiate any other desired activity that is contingent on the positive verification of the person's identity. Conversely, if a match is not found, a suitable signal may be sent to the remote terminal 11 by the central station 10 so that the remote terminal may initiate an appropriate action, for example, request that the user try again, shut the terminal down, or sound an alarm.

The GENERATE_SPECTRUM subroutine will now be described in more detail. This subroutine, called by the IMAGE_VERIFY program, is illustrated by the functional flowchart shown in FIG. 7. GENERATE_SPECTRUM takes a list of X, Y coordinate pairs identifying a set of minutiae, i.e., a feature vector array, and generates a matrix of distances from each minutia to every other minutia, analogous to a road map mileage chart that tells you the distance from each city to every other city.

*maxcount* is defined as the number of minutiae found in the feature vector. *coordx* is a linear array of n elements which contains the X coordinates of the feature vector in order. Similarly, *coordy* is linear array of n elements which contains the Y coordinates of the feature vector in order. An array called *spectra* will contain the distance spectra for the minutiae and is therefore of the dimensions *maxcount* × *maxcount*.

The heart of GENERATE_SPECTRUM is a computational loop in which the distance between each possible pair of minutiae is calculated and stored in *spectra*. For a pair of minutiae identified as i and j, the distance between the two minutiae is calculated by the equation:

$$\text{spectra}(i, j) = \sqrt{(dx \cdot dx) + (dy \cdot dy)}$$

where dx is the difference between the X coordinate values of the minutiae, as found in *coordx*, and dy is the difference between the Y coordinate values of the minutiae as found in *coordy*. Each row of *spectra* corresponds to a different minutia of the feature vector and will eventually contain the distance values between that minutia and all other minutiae of the feature vector. The resulting distance spectra, where each row of *spectra* constitutes a distance spectrum for its associated minutia, are returned to IMAGE_VERIFY through the *spectra* array.

The ANALYZE_SPECTRUM subroutine will now be described in more detail. This subroutine is also called by the IMAGE_VERIFY program and is illustrated by the functional flowchart shown in FIG. 8. ANALYZE_SPECTRUM takes the distance spectra calculated by the GENERATE_SPECTRUM subroutine for both the live feature vector and the master feature vector, compares each live distance spectrum to each master distance spectrum, and notes the correlation between the distance values in each live distance spectrum and master distance spectrum.

The following arrays and variables are defined for use in the ANALYZE_SPECTRUM subroutine;

*master* is an nxn array that is assigned the master distance spectra stored in *spec-master*;

*mastercount* is the number of distance spectra in *master*, i.e., the number of minutiae in the master data;

*live* is an nxn array that is assigned the live master distance spectra stored in *spec-live*;

*livecount* is the number of distance spectra in live, i.e., the number of minutiae found in the live fingerprint;

*spectrum-match* corresponds to the *match* array previously described and is a linear array which will contain the differences between distance values in *master* and *live*;

*link-addr* corresponds to the *address* array previously described and is an index to *spectrum-match*, i.e., it will identify which one of the live minutiae is associated with the location in *spectrum-match* corresponding to each location in *link-addr*;

i is an index to the *master* array;

j is an index to the *live* array; and k is an index to *spectrum-match* and *link-addr*.

The heart of ANALYZE_SPECTRUM is a computational loop which successively cycles through each master distance spectrum in *master* (as i is incremented) and, for each master distance spectrum, cycles through each live distance spectrum in *live* (as j is incremented) comparing each live distance spectrum with the master distance spectrum currently being evaluated. After all live distance spectra are compared with all master distance spectra, the results of the comparison are returned to the IMAGE_VERIFY program through *spectrum match* and *link-addr*.

The actual comparison of distance spectra is accomplished by SPEC_COMPARE, a subroutine called from within the computational loop of ANALYZE_SPECTRUM. The operation of SPEC_COMPARE will now be described in relation to the flowchart shown in FIGS. 9A-B. One master distance spectrum and one live distance spectrum are passed to SPEC_COMPARE by ANALYZE_SPECTRUM and stored in *master-row* and *live-row*, respectively. *matchcount* holds a running total of matches between distance values of the two spectra being compared.

i is the index to the distance values in *master-row* and has a maximum value of *iend*, the number of master minutiae. j is the index to the distance values in *live-row* and has a maximum value of *jend*, the number of minutiae that were found in the live fingerprint.

In operation, each distance value in the master distance spectrum is attempted to be matched with a distance value in the live distance spectrum. The distance values in the master distance spectrum are processed in order, i.e., by increasing magnitude, as are the distance values in the live distance spectrum. Two distance values are deemed a match if the absolute difference between the distance values, i.e., *dspec*, is less than or equal to the predetermined tolerance value *spec-epsilon*. The value of *spec-epsilon* is selected according to the desired stringency of the matching system. That is, a smaller value of *spec-epsilon* will require a closer correlation between the live and master minutiae in order to find a match, whereas a larger value of *spec-epsilon* will permit a match between live and master minutiae having less of a correlation. For minutiae identified on a 256 by 256 grid, corresponding to approximately one square centimeter of the live fingerprint pattern, a value of six for *spec-epsilon* has been found to be a suitable tolerance.

If the difference between the compared distance values satisfies the specified tolerance, *matchcount* is incremented by one and the next master distance value is attempted to be matched with one of the remaining live distance values. If the difference value *dspec* is greater than *spec-epsilon* for a particular live distance value, the next largest live distance value is attempted to be compared with the same master distance value. This evaluation continues until all distance values in the master distance spectrum have been attempted to be matched, or the distance values in the live distance spectrum have been exhausted, or it is not possible to match further live distance values with the remaining master distance values.

At the end of the operation of SPEC_COMPARE, the number of distance values in the master distance spectrum that have been matched to distance values in the live distance spectrum, i.e., *matchcount,* is returned to the computational loop of the ANALYZE_SPECTRUM subroutine and stored in *spectrum match* (See FIG. 8). SPEC_COMPARE will be called once by ANALYZE_SPECTRUM for each pair combination of a master distance spectrum and a live distance spectrum, for a total of *mastercount×livecount* times. Thus, *spectrum match* will have (*mastercount×livecount*) entries, where each entry contains the number of distance values that were found by SPEC_COMPARE to be matched between a unique pairing of a master distance spectrum and a live distance spectrum. *link addr,* the index to *spectrum-match,* will also have (*master-count×livecount*) entries which list live distance spectrum row numbers, one through *livecount* repeated *mastercount* times. It is these arrays, *spectrum match* and *link-addr,* that are finally returned by ANALYZE_SPECTRUM to the IMAGE_VERIFY program.

The final evaluation of the data representing the correlation between distance values of the master and live distance spectra is performed in the IMAGE_MATCH subroutine, which is called once near the end of the IMAGE_VERIFY program following the execution of the ANALYZE_SPECTRUM subroutine (see FIG. 5B). IMAGE_MATCH receives the *spectrum-match* and the *link-addr* arrays and returns the Boolean variable *is-a-match* which indicates whether an overall match exists. The IMAGE_MATCH subroutine will now be described in relation to FIGS. 10A-10B.

*spectrum-match, link-addr, mastercount* and *livecount* are defined the same as in the ANALYZE_SPECTRUM subroutine.

*spec-match-threshold* is a preselected number representing the minimum proportion of distance values in a master distance spectrum that must have found matches in a live distance spectrum in order to consider the master distance spectrum as being matched to the associated live distance spectrum. This value is arbitrarily set at 67%, although a larger or smaller number may be chosen in accordance with the desired stringency of the matching system.

*accept-spectrum* is the minimum number of distance values in a master distance spectrum that must have found matches with distance values from a live distance spectrum for the aster distance spectrum to be deemed as matching that live distance spectrum.

*minimum-match %* is a preselected number representing the minimum proportion of the distance values of all master distance spectra that must be found in a matched master distance spectrum and matched with a distance value in the associated live distance spectrum in order for an overall match to be indicated by the system. This value is set at 63%, although this value also may be chosen in accordance with the desired stringency of the matching system.

*sigma-matches* is the running total of the number of matched distance values in the matched master distance spectra.

*select* is a linear array have n elements which will contain, for each live distance spectrum, the value of the greatest number of matches between the distance values in that live distance spectrum and distance values in the various master distance spectra.

*total-elements* is equal to the total number of possible pairings of master minutiae and live minutiae.

Turning to the portion of the IMAGE_MATCH flowchart shown in FIG. 10A, the loop at the bottom of FIG. 10A searches through *spectrum-match* to find for each live distance spectrum the master distance spectrum that matches it the best. This is done by finding the master distance spectrum with which the live distance spectrum has the most matched distance values. *link-addr* provides the index to *spectrum-match* to keep track of the live distance spectrum with which each location of *spectrum-match* is associated. When the closest matching master distance spectrum is found for a particular live distance spectrum, the number of matches between distance values of the two spectra is stored for that live distance spectrum in the *select* array. After all of the values in *spectrum-match* have been evaluated (i.e., i≧*total-elements*), the final match evaluation is performed, as illustrated in FIG. 10B.

The loop in the programming shown in FIG. 10B checks the number of the most distance matches for each live distance spectrum, and if that number is equal to or greater than *accept-spectrum* that number of distance matches is accumulated in *sigma-matches.* After the loop evaluates all live distance spectra, *sigma-matches* will equal the number of matched distance values in the master distance spectra that are deemed to be matched with live distance spectra. *match %* is then formed as the ratio of the number in *sigma-matches* to the number in *total-elements.* In the present embodiment, if the resulting proportion exceeds 63%, i.e., *minimum-match %,* then the live fingerprint image being tested is deemed matched. This is indicated in IMAGE_MATCH by returning a "true" value to the IMAGE_VERIFY program in *is-a-match.* If *match %* does not exceed *minimum-match %,* the IMAGE_MATCH subroutine returns a "false" value to the IMAGE_VERIFY program in *is-a-match.*

Alternative standards for evaluating a match also may be utilized with the invention. For example, a final match of the live fingerprint to the master fingerprint could be defined to exist where the total number of matched master and live distance values exceeds a certain proportion of the maximum possible number, or where the proportion of matched master distance spectra exceeds a certain proportion of the total number of master distance spectra. In fact, the evaluation standard described in detail above is a hybrid of these two alternatives.

While there has been illustrated and described what is at present considered to be a preferred embodiment of the present invention, it will be understood by those skilled in the art that various changes and modifications may be made, and equivalents may be substituted for elements thereof without departing from the true scope of the invention. In addition, many modifications may be made to adapt the teachings of the invention to a particular situation without departing from the central scope of the invention. Therefore, it is intended that this invention not be limited to the particular embodiment disclosed as the best mode contemplated for carrying out this invention, but that the invention will include all embodiments falling within the scope of the appended claims.

We claim:

1. A method of matching a live image and a master image having any random or nonrandom distribution of characteristic features throughout an image, comprising the steps of:

generating a set of points representative of the characteristic features of the live image;

generating a set of points representative of the characteristic features of the master image; and evaluating the match between the live characteristic points and the master characteristic points, said step of evaluating consisting essentially of the further steps of:

deriving the distances between a plurality of pairs of the live characteristic points;

deriving the distances between a plurality of pairs of the master characteristic points; and comparing the live distances with the master distances to determine whether of not the live image matches the master image;

wherein the steps of deriving the distances between pairs of the live characteristic points and deriving the distances between pairs of the master characteristic points comprise for each such step the step of forming, for each point in the set of points, a spectrum of values representing the distances between the point and each other point in the set of points.

2. A method according to claim 1 further comprising the initial steps of:

providing a set of master images; and receiving an identification of one of the set of master images for matching with the live image.

3. A method according to claim 1 wherein the step of comparing comprises comparing each of the master distance spectra to live distance spectra by determining, for each such comparison of a master distance spectrum to alive distance spectrum, the distance values in the master distance spectrum that match separate distance values in the live distance values in the live distance spectrum within a predetermined tolerance.

4. A method according to claim 3 wherein the step of comparing further comprises indicating a match between the live image and the master image if at least a predetermined proportion of master distance spectra are matched with separate live distance spectra, where a master distance spectrum is deemed to match a live distance spectrum if the proportion of the distance values in the master distance spectrum that match distance values in the live distance spectrum exceeds a predetermined value.

5. A method of identifying a person's identity consisting essentially of the steps of:

receiving an identification of selected live minutiae appearing in at least a portion of a selected fingerprint of the person, where the minutiae are identified by their spatial coordinates relative to a reference coordinate system and may be randomly or nonrandomly distributed throughout said fingerprint portion;

deriving the distances between a plurality of pairs of the live minutiae;

providing values for the distances between a plurality of pairs of selected minutiae appearing inn at least a portion of a master fingerprint wherein the minutiae may be randomly or nonrandomly distributed throughout said fingerprint portion; and comparing the live distance with the master distances to determine whether or not the live fingerprint matches the master fingerprint;

wherein the steps of deriving the distances between pairs of live minutiae and providing the distances between pairs of master minutiae comprise for each such step the step of forming, for each minutia, a spectrum of values representing the distances between the minutia and each other minutia in its set of live or master minutiae.

6. A method according to claim 5 further comprising the steps of:

providing a collection of sets of master minutiae appearing in at least a portion of their associated master fingerprints; and receiving an identification of one of the sets of master minutiae and deriving the distances between a plurality of pairs of minutiae in that set of master minutiae.

7. A method according to claim 5 wherein the step of comparing further comprises indicating a match for the live fingerprint if at least a predetermined proportion of master distance spectra are matched with live distance spectra, where a master distance spectrum is deemed to match a live distance spectrum if a predetermined proportion of the distance values in the master distance spectrum match distance values in the live distance spectrum within a predetermined tolerance.

8. A method according to claim 5 further comprising the step of generating an indication of a match if the live fingerprint is successfully matched with the master fingerprint, or alternatively generating an indication of the absence of a match if the live fingerprint is unsuccessfully matched with the master fingerprint.

9. An apparatus for matching a live image and a master image having any random distribution of characteristic features throughout an image, comprising:

a first means for receiving and storing a set of points representative of the characteristic features of the live image;

a second means for receiving and storing a set of points representative of the characteristic features of the master image;

computing means for receiving the live and the master characteristic points from the first and second means, deriving a distances between a plurality of pairs of the live characteristic points and deriving the distances between a plurality of pairs of the master characteristic points, wherein the computing means derives, for each characteristic point in each of the sets of live and master characteristic points, a spectrum of values representing the distances between the characteristic point and each other characteristic point in its set of characteristic points; and means for comparing the live distances with the master distances and initiating a predetermined activity essentially only on the basis of a match between the live distances and the master distances within a predetermined tolerance.

10. An apparatus according to claim 9 wherein the first means further comprises means for sensing the live image and forming a two-tone digital representation thereof; means for storing the digital representation; and means for processing the digital representation to generate a set of points representative of characteristic features of the live image.

11. An apparatus according to claim 9, further comprising a third means associated with the first means for receiving an indication of the purported identity of the live image; and storage means for storing a plurality of sets of points representative of characteristic features of a plurality of corresponding master images;

wherein the computing means is adapted to receive from the third means a signal identifying the purported identity of the live image and obtain from the storage means a set of points for the master image associated with the purported identity.

* * * * *